(12) United States Patent
McConnell et al.

(10) Patent No.: US 7,574,212 B2
(45) Date of Patent: Aug. 11, 2009

(54) METHOD AND SYSTEM FOR MANAGING COMMUNICATION SESSIONS DURING MULTI-MODE MOBILE STATION HANDOFF

(75) Inventors: Von K. McConnell, Leawood, KS (US); Manish Mangal, Overland park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 354 days.

(21) Appl. No.: 11/158,628

(22) Filed: Jun. 22, 2005

(65) Prior Publication Data

US 2006/0291419 A1 Dec. 28, 2006

(51) Int. Cl.
*H04W 36/00* (2006.01)
*H04W 4/00* (2006.01)

(52) U.S. Cl. ............... 455/437; 455/436; 455/432.1; 455/432.2; 455/432.3; 370/331

(58) Field of Classification Search ............... 370/328, 370/338, 342; 455/403, 432.1, 435.2, 436, 455/437, 438
See application file for complete search history.

(56) References Cited

U.S. PATENT DOCUMENTS

| | | | |
|---|---|---|---|
| 6,556,824 B1 * | 4/2003 | Purnadi et al. | 455/442 |
| 6,567,666 B2 * | 5/2003 | Czaja et al. | 455/442 |
| 6,580,699 B1 * | 6/2003 | Manning et al. | 370/331 |
| 6,862,446 B2 | 3/2005 | O'Neill et al. | |
| 6,987,985 B2 * | 1/2006 | Purkayastha et al. | 455/552.1 |
| 6,988,146 B1 * | 1/2006 | Magret et al. | 709/238 |
| 7,046,646 B2 * | 5/2006 | Kilgore | 370/331 |
| 7,046,989 B2 * | 5/2006 | Karaoguz et al. | 455/408 |
| 7,050,793 B1 * | 5/2006 | Kenward et al. | 455/414.4 |
| 7,133,669 B2 * | 11/2006 | Nair et al. | 455/432.1 |
| 7,149,524 B2 * | 12/2006 | Reynolds | 455/437 |

(Continued)

FOREIGN PATENT DOCUMENTS

EP    1 370 056 A1    12/2003

(Continued)

OTHER PUBLICATIONS

Calvagna et al. "A User-Centric Analysis of Vertical Handovers." WMASH'04, Oct. 1, 2004. Philadelphia, PA.*

(Continued)

*Primary Examiner*—Lester Kincaid
*Assistant Examiner*—Nathan Mitchell (57) ABSTRACT

A multi-mode mobile station includes a first interface for wireless communication with a wireless local area network (WLAN) and a second interface for wireless communication with a wireless wide area network (WWAN). The multi-mode mobile station may become engaged in one or more communication sessions via a first wireless network. Session information regarding these one or more communication sessions is stored in a storage system. In response to a handoff request, a control system evaluates the session information to determine which of the communication sessions, if any, can be continued via the second wireless network, in accordance with a policy. The user may be notified of any sessions that can not be continued via the second wireless network and/or continued at a reduced level of performance. If the user opts to complete the handoff, continuable sessions are continued via the second wireless network and non-continuable sessions are dropped.

20 Claims, 3 Drawing Sheets

U.S. PATENT DOCUMENTS

| | | | |
|---|---|---|---|
| 7,151,931 B2* | 12/2006 | Tsao et al. | 455/435.2 |
| 7,257,403 B2* | 8/2007 | Nikkelen | 455/436 |
| 7,301,938 B2* | 11/2007 | Ejzak | 370/352 |
| 7,339,908 B2* | 3/2008 | Uhlik et al. | 370/331 |
| 7,471,950 B1* | 12/2008 | Oh et al. | 455/436 |
| 2002/0082015 A1* | 6/2002 | Wu | 455/436 |
| 2002/0085514 A1 | 7/2002 | Illidge et al. | |
| 2003/0009583 A1* | 1/2003 | Chan et al. | 709/236 |
| 2003/0026245 A1 | 2/2003 | Ejzak | |
| 2003/0027569 A1 | 2/2003 | Ejzak | |
| 2003/0027595 A1 | 2/2003 | Ejzak | |
| 2003/0125028 A1 | 7/2003 | Reynolds | |
| 2003/0133421 A1 | 7/2003 | Sundar et al. | |
| 2003/0134636 A1 | 7/2003 | Sundar et al. | |
| 2003/0134638 A1 | 7/2003 | Sundar et al. | |
| 2003/0134650 A1 | 7/2003 | Sundar et al. | |
| 2004/0008669 A1* | 1/2004 | Bos et al. | 370/352 |
| 2004/0008689 A1* | 1/2004 | Westphal et al. | 370/395.21 |
| 2004/0095924 A1* | 5/2004 | Holur et al. | 370/352 |
| 2004/0120277 A1 | 6/2004 | Holur et al. | |
| 2004/0156329 A1 | 8/2004 | Back et al. | |
| 2004/0203711 A1 | 10/2004 | O'Neill et al. | |
| 2004/0218575 A1* | 11/2004 | Ibe et al. | 370/338 |
| 2004/0219918 A1 | 11/2004 | Kakishima et al. | |
| 2004/0225534 A1 | 11/2004 | Zheng | |
| 2004/0233866 A1* | 11/2004 | Bossoli et al. | 370/328 |
| 2005/0025164 A1 | 2/2005 | Kavanagh et al. | |
| 2005/0063324 A1 | 3/2005 | O'Neill et al. | |
| 2005/0130660 A1* | 6/2005 | Park et al. | 455/436 |
| 2005/0265345 A1 | 12/2005 | Chen et al. | |
| 2006/0014539 A1* | 1/2006 | Oh | 455/436 |
| 2006/0084439 A1* | 4/2006 | Joshi et al. | 455/436 |
| 2006/0109817 A1* | 5/2006 | Ramanna et al. | 370/331 |
| 2006/0120287 A1* | 6/2006 | Foti et al. | 370/231 |
| 2006/0126564 A1* | 6/2006 | Ramanna et al. | 370/331 |
| 2006/0256752 A1* | 11/2006 | Svensson et al. | 370/331 |
| 2006/0262751 A1* | 11/2006 | Vermola et al. | 370/331 |
| 2006/0276192 A1* | 12/2006 | Dutta et al. | 455/436 |
| 2007/0005803 A1* | 1/2007 | Saifullah et al. | 709/245 |

FOREIGN PATENT DOCUMENTS

| | | |
|---|---|---|
| EP | 1 439 725 A1 | 7/2004 |
| WO | WO 01/65881 A1 | 9/2001 |

OTHER PUBLICATIONS

Lin et al. "Integration of GPRS and Wireless LANs with Multimedia Applications." Advances in Multimedia Information Processing—PCM 2002: Third IEEE Pacific Rim Conference on Multimedia Hsinchu, Taiwan, Dec. 16-18, 2002. Proceedings.*

Ylianttila et al. "Optimatizion Scheme for Mobile Users Performing Vertical Handoffs between IEEE 802.11 and GPRS/EDGE networks." Global Telecommunications Conference, 2001. Globecom '01. IEEE.*

Calvagna et al. "Effects of the Vertical Handover Policy on the Performance of Internet Applications." Available Sep. 27, 2004.*

Inayat et al. "Providing Seamless Communication through Heterogeneous Wireless IP Networks." Proceedings of the International Conference on Wireless Networks, ICWN '04, Jun. 21-24, 2004, Las Vegas, Nevada, USA, vol. 1.*

Guo et al. "A Seamless and Proactive End-to-End Mobility Solution for Roaming Across Heterogeneous Wireless Networks." IEEE Journal On Selected Areas in Communications, vol. 22, No. 5, Jun. 2004.*

Sungkwan Jung; Dong-ho Cho; Song, O., "QoS based vertical handoff method between UMTS systems and wireless LAN networks," Vehicular Technology Conference, 2004. VTC2004-Fall. 2004 IEEE 60th, vol. 6, No., pp. 4451-4455 vol. 6, Sep. 26-29, 2004 URL: http://ieeexplore.ieee.org/stamp/stamp.jsp?arnumber=1404921&isnumber=30415.*

S. Balasubramaniam, J. Indulska, Vertical handover supporting pervasive computing in future wireless networks, Computer Communications, vol. 27, Issue 8, Advances in Future Mobile/Wireless Networks and Services, May 2004, pp. 708-719, ISSN 0140-3664, DOI: 10.1016/j.comcom.2003.10.010. (http://www.sciencedirect.com/science/article/B6TYP-4B3JKTS-.*

International Search Report from International Application No. PCT/US06/018084, dated Oct. 9, 2006.

Michael Hoghooghi et al., "Media Independent Handover," Joint Harmonized Contribution to IEEE 802.21 Working Group, May 2005.

Mani Mahalingam et al., "Media Independent Handover," Joint Harmonized Contribution to IEEE 802.21 Working Group, May 2005.

International Preliminary Report on Patentability, dated Jan. 10, 2008, from related International Application No. PCT/US2006/018084.

* cited by examiner

METHOD AND SYSTEM FOR MANAGING COMMUNICATION SESSIONS DURING MULTI-MODE MOBILE STATION HANDOFF

BACKGROUND

1. Field of the Invention

The present invention relates to telecommunications and, more particularly, to a method and system for managing a multi-mode mobile station's communication sessions during a handoff from a first wireless network to a second wireless network.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, or HomeRF, have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. Although such multi-mode mobile stations can provide better wireless coverage in more areas by being able to communicate over different wireless networks, they do not necessarily change their network connectivity in a seamless manner.

For example, a multi-mode mobile station may become engaged in one or more communication sessions via a first wireless network. The communications sessions may include, for example, one or more voice sessions and one or more data sessions. While engaged in these communication sessions, the multi-mode mobile station may move into an area in which the first wireless network no longer provides good wireless coverage but the second wireless network does. In that situation, it would be desirable for the multi-mode mobile station to be able to continue the communication sessions via the second wireless network. However, different types of wireless networks may support different types of communication sessions. Thus, the second wireless network might not be able to support all of the multi-mode mobile station's communication sessions, or the first wireless network might not be able to support all of the sessions at the same level of performance as the first wireless network.

Accordingly, there is a need to manage a multi-mode mobile station's communication sessions when a handoff from a first wireless network to a second wireless network is requested.

SUMMARY

In a first principal aspect, an exemplary embodiment of the present invention provides a method for communication session management for a multi-mode mobile station. The multi-mode mobile station has a first interface for wireless communication with a first wireless network and a second interface for wireless communication with a second wireless network. In accordance with the method, at least one communication session is established with the multi-mode mobile station via the first wireless network. Session information is stored regarding the at least one communication session. A handoff request is received. In response to the handoff request, the session information is evaluated to determine, in accordance with a policy, which of the at least one communication session, if any, can be continued via the second wireless network.

In a second principal aspect, an exemplary embodiment of the present invention provides a method for session handoff between a first wireless network and a second wireless network for a multi-mode mobile station. The multi-mode mobile station has a first interface for wireless communication with the first wireless network and a second interface for wireless communication with the second wireless network. In accordance with the method, a plurality of communication sessions is established with the multi-mode mobile station via the first wireless network. The plurality of communication sessions includes a voice session between the multi-mode mobile station and an endpoint. Session information regarding the plurality of communication sessions is stored. A handoff request is received. In response to the handoff request, the session information is evaluated to determine, in accordance with a policy, which of the communication sessions can be continued via the second wireless network. It is determined that the voice session can be continued via the second wireless network, in accordance with the policy. The voice session is continued via the second wireless network.

In a third principal aspect, an exemplary embodiment of the present invention provides a system for communication session management for a multi-mode mobile station. The multi-mode mobile station has a first interface for wireless communication with a first wireless network and a second interface for wireless communication with a second wireless network. The system comprises: (1) a first-network storage system for storing first-network session information regarding first-network communication sessions established with the multi-mode mobile station via the first wireless network; (2) a second-network storage system for storing second-network session information regarding second-network communication sessions established with the multi-mode mobile station via the second wireless network; (3) a first-network evaluation system for evaluating, in response to a second-to-first network handoff request, the second-network session information to determine, in accordance with a first-network policy, which of the second-network communication sessions, if any, can be continued via the first wireless network; and (4) a second-network evaluation system for evaluating, in response to a first-to-second network handoff request, the first-network session information to determine, in accordance with a second-network policy, which of the first-network communication sessions, if any, can be continued via the second wireless network.

DETAILED DESCRIPTION OF EXEMPLARY EMBODIMENTS

1. Overview

The present invention, in its preferred embodiments, provides methods and systems for managing a multi-mode mobile station's communication sessions, e.g., in connection with a request for a handoff between a first wireless network and a second wireless network. The first and second wireless networks use different wireless communication technologies. For example, the first wireless network could be a wireless local area network (WLAN) that uses a protocol such as IEEE 802.11x, HiperLAN, HomeRF, Bluetooth for wireless communication. The second wireless network could be a wireless wide area network (WWAN) that uses, for example, CDMA or GSM for wireless communication. Thus, a multi-mode mobile station may have at least a first interface for wireless communication with the first wireless network and a second interface for wireless communication with the second wireless network.

The multi-mode mobile station's communication sessions may include one or more voice sessions, such as voice calls. The multi-mode mobile station's communication sessions may also include one or more data sessions, which may involve, for example, Web browsing, downloading one or more files, e-mail, instant messaging, or streaming video. A storage system may store session information regarding the one or more communication sessions in which the multi-mode mobile station is currently involved. For communication sessions established via a WLAN, the storage system could be, for example, a serving call session control function (S-CSCF). For communication sessions established via a WWAN, the storage system could be, for example, a mobile switching center (MSC).

The session information that is stored for a multi-mode mobile station's communication session may identify the session, e.g., by a session identifier and may include a description of the session (e.g., whether it is a voice or data session) and what services are being provided or are available during the session. The session information may also identify the participants of the session, including the multi-mode mobile station, for example, by directory number or by IP address. The session information may also include other information, such as signal strengths of one or more wireless networks, e.g., identified by SID/NID or SSID, that the multi-mode mobile station has been monitoring.

In response to a request for a handoff from a first wireless network to a second wireless network, an evaluation system may determine which of the communication sessions that the multi-mode mobile station is currently engaged in via the first wireless network can be continued via the second wireless network. The evaluation system may make this determination by obtaining the session information regarding the communication sessions from the storage system and then executing service logic that evaluates the session information in accordance with a predefined policy.

The predefined policy may specify what types of communication sessions can be continued via the second wireless network and under what conditions. For example, the policy may specify that voice sessions are generally continuable but that data sessions may or may not be continuable, depending, for example, on the architecture and/or available bandwidth of the second wireless network. In some cases, whether a session is continuable via the second wireless network may depend on what services can be supported by the second wireless network. For example, the multi-mode mobile station may be using a pre-paid service that is supported by the first wireless network but not by the second wireless network. The policy may also take into account the multi-mode mobile station's subscription level. Thus, in accordance with the policy, a communication session that is deemed continuable for a multi-mode mobile station with a high level subscription might not be deemed continuable for a multi-mode mobile station with only a basic level subscription.

In an exemplary embodiment, the evaluation system for a given wireless network is a network element that includes service logic for controlling the services offered to mobile stations via the given wireless network. Thus, the evaluation system for a WLAN could be an application server, and the evaluation system for a WWAN could be a service control point (SCP). In response to a request for a handoff from a first wireless network to a second wireless network, the evaluation system for the second wireless network may obtain the session information from the storage system for the first wireless network.

For example, in response to a request for a WWAN to WLAN handoff, an application server for the WLAN may obtain session information from the MSC that is serving the multi-mode mobile station. To do this, the S-CSCF for the WLAN may query the SCP for the WWAN. The SCP may then obtain the session information from the serving MSC and forward it to the S-CSCF, which, in turn, may forward the session information to the application server for evaluation.

In response to a request for a WLAN to WWAN handoff, the SCP for the WWAN may obtain session information from the S-CSCF for the WLAN. The SCP may do this directly if the address of the S-CSCF is known. If the SCP does not know the address of the S-CSCF, then the SCP may query an interrogating call session control function (I-CSCF), which then locates the S-CSCF that has been serving the multi-mode mobile station.

In an exemplary embodiment, the multi-mode mobile station requests the handoff. Thus, while the multi-mode mobile station is engaged in one or more communication sessions via the first wireless network, the multi-mode mobile station may determine that the second wireless network is available and preferred. For example, the multi-mode mobile station may detect a stronger signal from the second wireless network than from the first wireless network. In response, the multi-mode mobile station may transmit, via the second wireless network, a handoff request that requests a handoff from the first wireless network to the second wireless network. In response to this handoff request, the evaluation system for the second wireless network may obtain and evaluate the session information stored in the storage system for the first wireless network regarding the multi-mode mobile station's communication sessions.

The evaluation system may evaluate the session information to determine, in accordance with the predefined policy for the second wireless network, which of the multi-mode mobile station's communications are continuable via the second wireless network and which are not. The policy may take a number of considerations into account. Key considerations may include, for example, the type of communication session (e.g., whether voice or data), the services being used or available to be used during the communication session, the capabilities of the second wireless network (e.g., its network architecture and available bandwidth). The policy may also consider the device capabilities of the multi-mode mobile station and the service level to which the user of the multi-mode mobile station has subscribed. The policy may also take into account the time and day and the current traffic load in the second wireless network. The policy may also consider other factors.

The evaluation system may then provide a notification to the multi-mode mobile station regarding any communication sessions that are not continuable via the second wireless network. In addition, the evaluation system may determine that one or more communication sessions can be continued via the second wireless network, but only at a reduced level of performance relative to the first wireless network. For example, a communication session continued via the second wireless network may have a slower response time, e.g., due to less bandwidth, and/or fewer available services. The multi-mode mobile station may also notified regarding communication sessions can be continued but at only a reduced level of performance.

In an exemplary embodiment, the notification regarding the continuability or non-continuability of communication sessions is provided to the multi-mode mobile station in one or more text messages, in a recorded or speech-synthesized announcement, or in some other way that conveys the information to the user. The user may then be given one or more options regarding how to proceed based on this information. In one exemplary embodiment, the user may have the option of either completing or not completing the handoff process. In another exemplary embodiment, the user may have the option to select which of the continuable sessions to continue. Alternatively, other types of options may be given to the user. As one example, if the user is downloading a file in a data session that is non-continuable, the user may have the option of waiting for the download to be completed before proceeding with the handoff. As another example, the user may be given the option of continuing the communication session via the second wireless network at a reduced level of performance relative to the first wireless network. As yet another option, the user may be given the opportunity to pay an additional fee or to upgrade to a higher subscription level to continue the communication session via the second wireless network. In some cases, the user may be required to submit a password or other security credentials in order to continue the communication via the second wireless network.

How the user is able to select options may depend on how the notification is provided. For example, if the notification is provided as a text message, the user might select options by interacting with a user interface of the multi-mode mobile station, e.g., by pressing buttons on a keypad or tapping on a touch screen. If the notification is provided as a recorded or voice-synthesized message, the user may select options by interacting with an interactive voice response (IVR) system, e.g., using DTMF tones or voice commands.

The option that the user selects may be communicated to the evaluation system, which may then respond accordingly. Thus, if the user opts to proceed with the handoff, the evaluation system may effect handoffs of the continuable communication sessions from the first wireless network to the second wireless network. To effect a handoff of a communication session, a bearer path may be established between the second wireless network and an anchor point of the first wireless network. If the first wireless network is a WWAN, the anchor point could be, for example, an MSC, a packet data serving node (PDSN), or home agent. If the first wireless network is a WLAN, the anchor point could be, for example, a media gateway, media resource function (MRF), or router.

2. Exemplary Network Architecture

Figure 1:
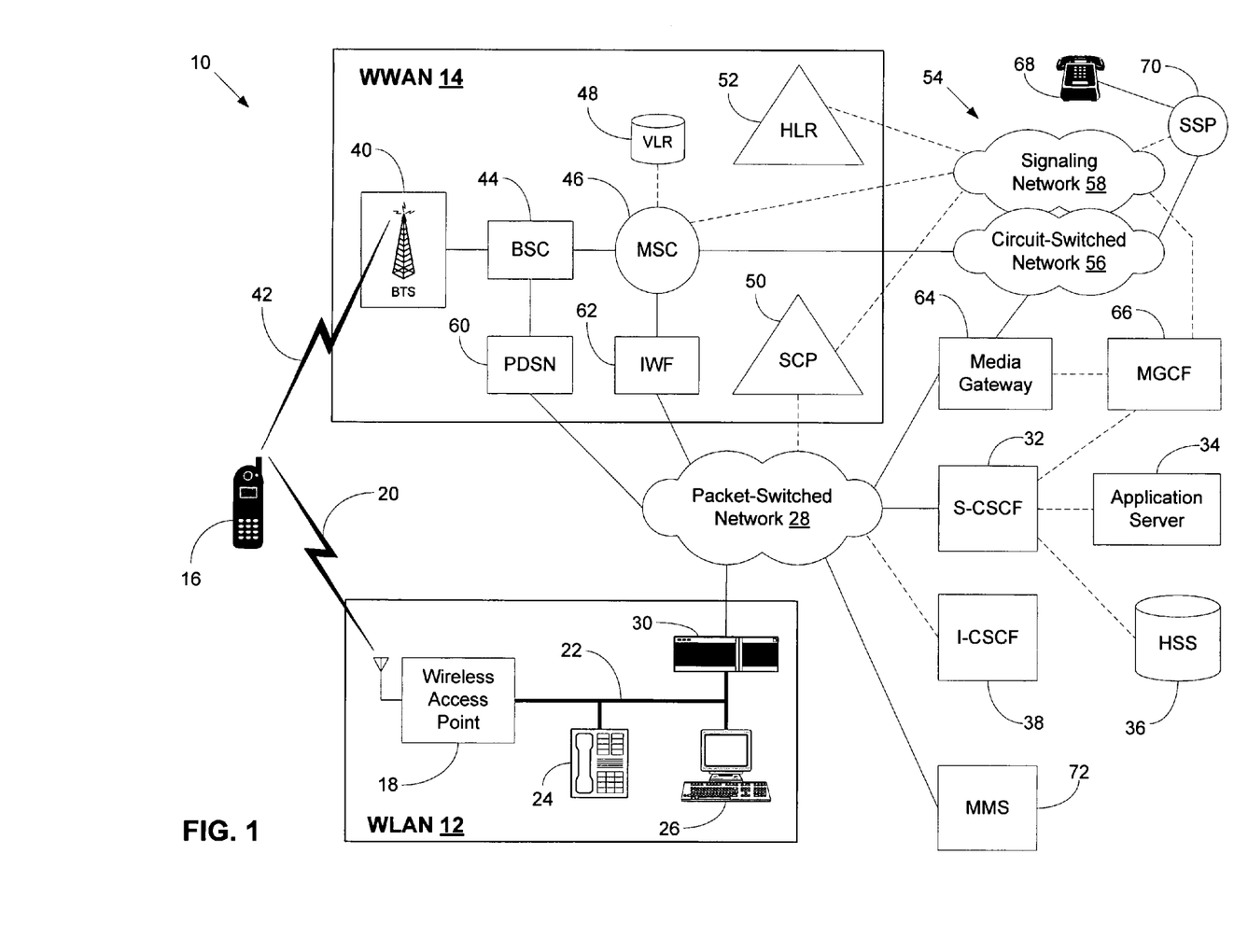
FIG. 1 is a simplified block diagram of a wireless telecommunications system, in accordance with an exemplary embodiment of the present invention.

FIG. 1 is a simplified block diagram of an exemplary wireless telecommunications system 10. In FIG. 1, connections that primarily carry voice, data, or other media exchanged during communication sessions are indicated by solid lines. Connections that carry primarily signaling are indicated by dashed lines.

Wireless telecommunications system 10 includes network elements that function together as a wireless local area network (WLAN) 12 and network elements that function together as a wireless local area network (WWAN) 14. WLAN 12 may provide wireless coverage in a relatively limited area, such as in a building or part of a building, and may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, IEEE 802.11h, or IEEE 802.11n (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multi-channel Multipoint Distribution Service (MMDS), or some other wireless protocol or format for wireless communication.

WWAN 14 may provide wireless coverage in a relatively large geographic area, such as an entire city, for example, by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. Thus, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14.

Multi-mode mobile station 16 may be a wireless telephone, wirelessly-equipped personal digital assistant (PDA), wirelessly-equipped laptop computer, or other type of wireless communication device. The first and second interfaces of multi-mode mobile station 16 may each include an antenna, a radio frequency (RF) transceiver, and a communication module appropriate for communicating using the particular wireless technology. A communication module may be implemented by hardware, firmware, and/or software.

WLAN 12 includes at least one wireless access point 18. Wireless access point 18 provides a wireless coverage area within which wireless access point 18 is able to communicate with wireless communication devices, such as multi-mode mobile station 16, over an air interface 20. Wireless access point 18 may be communicatively coupled to other network elements, e.g., via a local area network (LAN) 22. LAN 22 may carry voice, data, and/or other media in a packet-based format. Thus, LAN 22 may be connected to other communication devices that exchange voice in a packet-based format. For example, LAN 22 may be connected to a voice-over-packet (VoP) telephone 24, a personal computer 26 equipped for audio communication, e.g., equipped with a microphone and speaker, and/or one or more other wireless access points.

LAN 22 may be communicatively coupled to a wide area packet-switched network 28, via a network access device 30. Network access device 30 could be, for example, a cable modem, DSL modem, or router. Packet-switched network 28 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 28 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 28. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 28 that involve WLAN 12. Multi-mode mobile station 16 may include its own SIP user agent for SIP signaling. Alternatively, another network element, such as wireless access point 18, may engage in SIP signaling on behalf of multi-mode mobile station 16. Although exemplary embodiments are described herein with reference to SIP signaling, it is to be understood that other signaling protocols could be used.

Wireless telecommunications system 10 may use an IP Multimedia Subsystem (IMS) architecture to support communication sessions carried over WLAN 12. The IMS approach is described in a number of technical specifications of the 3$^{rd}$ Generation Partnership Project (3GPP), including TS 23.218 version 6.2.0 (2004-09), TS 23.228 version 5.12.0 (2004-03), and TS 24.229 version 6.4.0 (2004-09), which documents are incorporated herein by reference.

In accordance with the IMS approach, wireless telecommunications system 10 may include a serving call session control function (S-CSCF) 32 that serves WLAN 12 and that is communicatively coupled to packet-switched network 28. S-CSCF 32 may function as a SIP registrar for registering SIP user agents communicating from WLAN 12 and may function as a SIP proxy server for routing SIP signaling messages to and from WLAN 12.

S-CSCF 32 may perform these functions in accordance with service logic located in one or more other network elements, such as an application server 34. Although FIG. 1 shows S-CSCF 32 communicatively coupled to only one application server, it is to be understood that S-CSCF 32 could be communicatively coupled to multiple application servers. For example, the service logic for different services may be located in different application servers.

S-CSCF 32 may also be communicatively coupled to a home subscriber server (HSS) 36. HSS 36 may store WLAN user profiles for subscribers authorized to use WLAN 12 for VoP or other services. Some of the subscribers may also be authorized to use WWAN 14. Thus, HSS 36 may store a WLAN user profile associated with multi-mode mobile station 16. A WLAN user profile may specify what services the user has subscribed to and, thus, has available via WLAN 12 and may also specify the user's preferences regarding how those services are provided.

A WLAN user profile may include filter criteria that S-CSCF 32 uses to determine what SIP signaling S-CSCF 32 should send or proxy to an application server, such as application server 34, and under what conditions, in order to provide the services subscribed to by the multi-mode mobile station's user. The filter criteria may also specify which application server the SIP signaling should be sent or proxied to. In an exemplary embodiment, S-CSCF 32 obtains, e.g., from HSS 36, the WLAN user profile associated with a given multi-mode mobile station when the given multi-mode mobile station registers with S-CSCF 32. Then, when S-CSCF 32 receives signaling from or directed to the given multi-mode mobile station, S-CSCF 32 applies the filter criteria from the WLAN user profile for the multi-mode mobile station to determine whether the signaling should be sent or proxied to an application server and, if so, which application server.

Although FIG. 1 shows only one S-CSCF, wireless telecommunications system 10 may include multiple S-CSCFs. Each S-CSCF may serve a particular network or groups of networks, for example, within a given geographic area. To accommodate queries that do not specify a particular S-CSCF, wireless telecommunications system 10 may include an interrogating call session control function (I-CSCF) 38. Thus, I-CSCF 38 may function as a contact point for signaling from other networks. For example, I-CSCF 38 may receive signaling, determine which S-CSCF should receive the signaling and then forward the signaling to the appropriate S-CSCF.

WWAN 14 may include a base transceiver station (BTS) 40 that provides a wireless coverage area within which BTS 40 may communicate with one or more mobile stations, such as multi-mode mobile station 16, over an air interface 42. Although FIG. 1 shows only one BTS, it is to be understood that WWAN 14 may include a plurality of BTSs that may provide a plurality of wireless coverage areas. The communications between BTS 40 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma 2000 such as described in EIA/TLA/IS-2000 Series, Rev. A (published March 2000), which is incorporated herein by reference.

BTS 40 may be controlled by a base station controller (BSC) 44, which, in turn, may be controlled by a mobile switching center (MSC) 46. Although FIG. 1 shows only one MSC and only one BSC, it is to be understood that WWAN 14 may include a plurality of MSCs, which may, in turn, control a plurality of BTSs, via a plurality of BSCs. MSC 46 also has access to a visitor location register (VLR) 48. VLR 48 stores WWAN user profiles for mobile stations, such as multi-mode mobile station 16, that are being served by MSC 46. Although FIG. 1 shows VLR 48 as a network element separate from MSC 46, VLR 48 may be integrated or co-located with MSC 46.

A WWAN user profile for a mobile station may identify what services the user of the mobile station has subscribed to and, thus, has available via WWAN 14. A WWAN user profile for a mobile station may also include a trigger address list that specifies one or more points during call processing for that mobile station at which MSC 46 should query another network elements, e.g., a service control point (SCP) 50, for call processing instructions. The communications between MSC 46 and SCP 50 may be "Wireless Intelligent Network" (WIN) signaling, e.g., as described in TIA/EIA/IS-771, published in July 1999, which is incorporated herein by reference. SCP 50 may also be able to communicate using other signaling formats. For example, SCP 50 may be able to send and receive SIP signaling via packet-switched network 28.

MSC 46 may obtain the WWAN user profile for a mobile station, such as multi-mode mobile station 16, from a home location register (HLR) 52, and then store the WWAN user profile in VLR 48, when the mobile station registers with MSC 46. HLR 52 may also perform mobility management functions. For example, HLR 52 may keep track of where mobile stations, such as multi-mode mobile station 16, have most recently registered. The communications between MSC 46 and HLR 52 may conform to IS-41 specifications. A recent revision of the IS-41 specifications, ANSI/TIA/EIA-41-D-97, published in December 1997, is incorporated herein by reference.

MSC 46 may also be connected to the public switched telephone network (PSTN) 54. PSTN 54 may use an out-of-band signaling system, such as Signaling System 7 (SS7) to route calls. Thus, PSTN 54 may include a circuit-switched network 56 that carries bearer traffic, i.e., the voice or other media in calls, and a signaling network 58 that carries signaling traffic used to set up, tear down, monitor, and control calls. Circuit-switched network 56 may include a plurality of trunks, with each trunk carrying media in a time division multiplexed (TDM) format. Signaling system 58 may include a plurality of networked signal transfer points (STPs).

MSC 46 may communicate with signaling network 58, e.g., using SS7 signaling, to route calls via circuit-switched network 56 to and from mobile stations being served by WWAN 14, such as multi-mode mobile station 16. MSC 46 may also communicate with SCP 50 and with HLR 52 via signaling network 58. The WIN signaling and IS-41 signaling may be carried in signaling network 58 as an SS7 application layer.

WWAN 14 may also be communicatively coupled to packet-switched 28, e.g., to exchange voice, data, and/or other media via packet-switched network. In particular, BSC 44 may include a packet control function (PCF) and may be communicatively coupled to packet-switched network 28 via a packet data serving node (PDSN) 60. Multi-mode mobile 16 may use Mobile IP for such communications, in which case, PDSM 60 may receive packets that are destined for multi-mode mobile station 16 via a home agent (not shown). Alternatively, or additionally, MSC 46 may be communicatively coupled to packet-switched network 28 via an interworking function (IWF) 62. In this way, mobile stations, such as multi-mode mobile stations 16, may have access to packet-switched network 28 via WWAN 14, e.g., for data and/or voice sessions. For example, WWAN 14 may communicatively couple multi-mode mobile station 16 to packet-switched network 28 for data sessions but may use PSTN 54 for voice sessions (i.e., voice calls). Alternatively, WWAN 14 may use packet-switched network 28 for both voice and data sessions, e.g., in accordance with EV-DO specifications.

Wireless telecommunications system 10 may also include a media gateway 64 that is connected to circuit-switched network 56 and packet-switched network 28. Media gateway 64 converts between the media formats used in these two networks. For example, media gateway 64 may convert between the TDM format used in circuit-switched network 56 and the RTP format used in packet-switched network. Media gateway 64 may, in turn, be controlled by a media gateway control function (MGCF) 66. MGCF 66 may engage in SIP signaling with S-CSCF 38 and engage in SS7 signaling via signaling network 58 to establish communication sessions though media gateway 64.

In an exemplary embodiment, media gateway 64 may server as an anchor point for all communication sessions, or all communication sessions of a certain type (e.g., voice sessions), involving multi-mode mobile station 16 via WLAN 12. Thus, such communication sessions may be established with a bearer path through media gateway 64. This may be done in order to facilitate handoffs to WWAN 14. For example, a communication session between multi-mode mobile station 16 and an endpoint may be set up so that the session includes a first segment between anchor point 64 and the endpoint and a second segment between anchor point 64 and WLAN 12. Then, in response to a handoff request, the communication session may be continued via WWAN 14 by establishing a third segment between anchor point 64 and WWAN 14, e.g., via circuit-switched network 56 or via packet-switched network 28. Once multi-mode mobile station 16 is able to continue the communication session via WWAN 14, the second segment, between anchor point 64 and WLAN 12 may be dropped.

WLAN 12 may use anchor points instead of or in addition to media gateway 64. As one example, a router directly controlled by S-CSCF 32 could be used as an anchor point. As another example, a media resource function (MRF) may be used an anchor point. The MRF could be able to communicate with WWAN 14 using IS-41 signaling.

WWAN 14 may also use one or more network elements as anchor points to facilitate handoffs to WLAN 12. For example, MSC 46, or a media gateway, may serve as an anchor point for voice calls. For packet-based communication sessions, including VoP sessions, WWAN 14 may use PDSN 60, a home agent, or MRF as an anchor point.

3. Exemplary Communication Sessions

In an exemplary embodiment, wireless telecommunications system 10 enables multi-mode mobile station 16 to engage in voice sessions via WLAN 12 and via WWAN 14. Such voice sessions could be, for example, voice calls with endpoints connected to PSTN 54. For example, multi-mode mobile station 16 may become engaged in a voice call with a landline telephone 68 that is connected to PSTN 54 via a service switching point (SSP) 70. If multi-mode mobile station 16 is engaged in the call via WWAN 14, then MSC 46 may serve as the anchor point. If multi-mode mobile station 16 is engaged in the call via WLAN 12, then media gateway 64 may serve as the anchor point. It is to be understood that, in addition to a landline telephone connected to the PSTN, multi-mode mobile station 16 may become engaged in voice sessions with other types of communication devices, e.g., wireless devices, which may be communicatively coupled to either circuit-switched or packet-switched networks.

However, voice sessions may be different depending on whether they are carried over WLAN 12 and WWAN 14. In particular, different services may be available during a voice session depending on whether the session is via WLAN 12 or via WWAN 14. This is because different service logic and/or policies may be applied depending on whether a communication session is carried via WLAN 12 or via WWAN 14. For example, an application server, such as application server 34, may control services for communication sessions carried via WLAN 12. For communication sessions carried via WWAN 14, the serving MSC, e.g., MSC 46 and/or SCP 50, may control the services.

As described in more detail below, the process of effecting a handoff between WLAN 12 and WWAN 14 may involve determining what services are being used (or could be used) by the multi-mode mobile station in the voice session carried by the original wireless network and then determining whether the same services can be provided by the target wireless network. If the target wireless network is not able to provide the same services, then the multi-mode mobile station may be informed of this fact. The user of the multi-mode mobile station may then be given the option of either continuing or not continuing with the handoff process.

Wireless telecommunications system 10 may also enable multi-mode mobile station 16 to engage in data sessions via WLAN 12. Such data sessions may involve communication with one or more servers for Web browsing, e-mail, instant message, or streaming video, for example. For example, multi-mode mobile station 16 may receive streaming video from a multimedia server (MMS) 72.

Multi-mode mobile station 16 may also be able to engage in data sessions via WWAN 14. For example, multi-mode mobile station 16 may be able to access packet-switched network 28 (and, thus, servers such as MMS 72) via PDSN 60 or IWF 62. However, the types of data sessions available to multi-mode mobile station 16 via WWAN 14 may be more limited than what is available via WLAN 12. This is because WWAN 14 may lack the bandwidth to support certain types of data sessions. In some cases, WWAN 14 may lack the network architecture to support any type of data session. Thus, in some cases, wireless telecommunications system 10 may not be able to hand off certain types of data sessions from WLAN 12 to WWAN 14. In other cases, a data session handoff from WLAN 12 to WWAN 14 may be available, but only with a reduced level of performance relative to WLAN 12, e.g., lower transfer speeds or higher latency. In such cases, the multi-mode mobile station may be informed that the data session can not be continued via WWAN 14 or that the data session can be continued but only at a reduced level of performance.

In some cases, multi-mode mobile station 16 may be engaged in more than one communication session at the time the handoff is requested. For example, multi-mode mode mobile station 16 might be engaged in one voice session, such as a voice call with landline telephone 68, and one data session, such as receiving streaming video from MMS 72. However, because of the differences between WLAN 12 and WWAN 14, not all of the communications session may be continuable from the original wireless network to the target wireless network, or a communication session may be continuable at only a reduced level of performance. An exemplary method for determining which of the communication sessions are continuable and which are not in response to a handoff request, and then effecting the handoff for a continuable communication session, is described in more detail below.

4. Exemplary Operation

Figure 2:
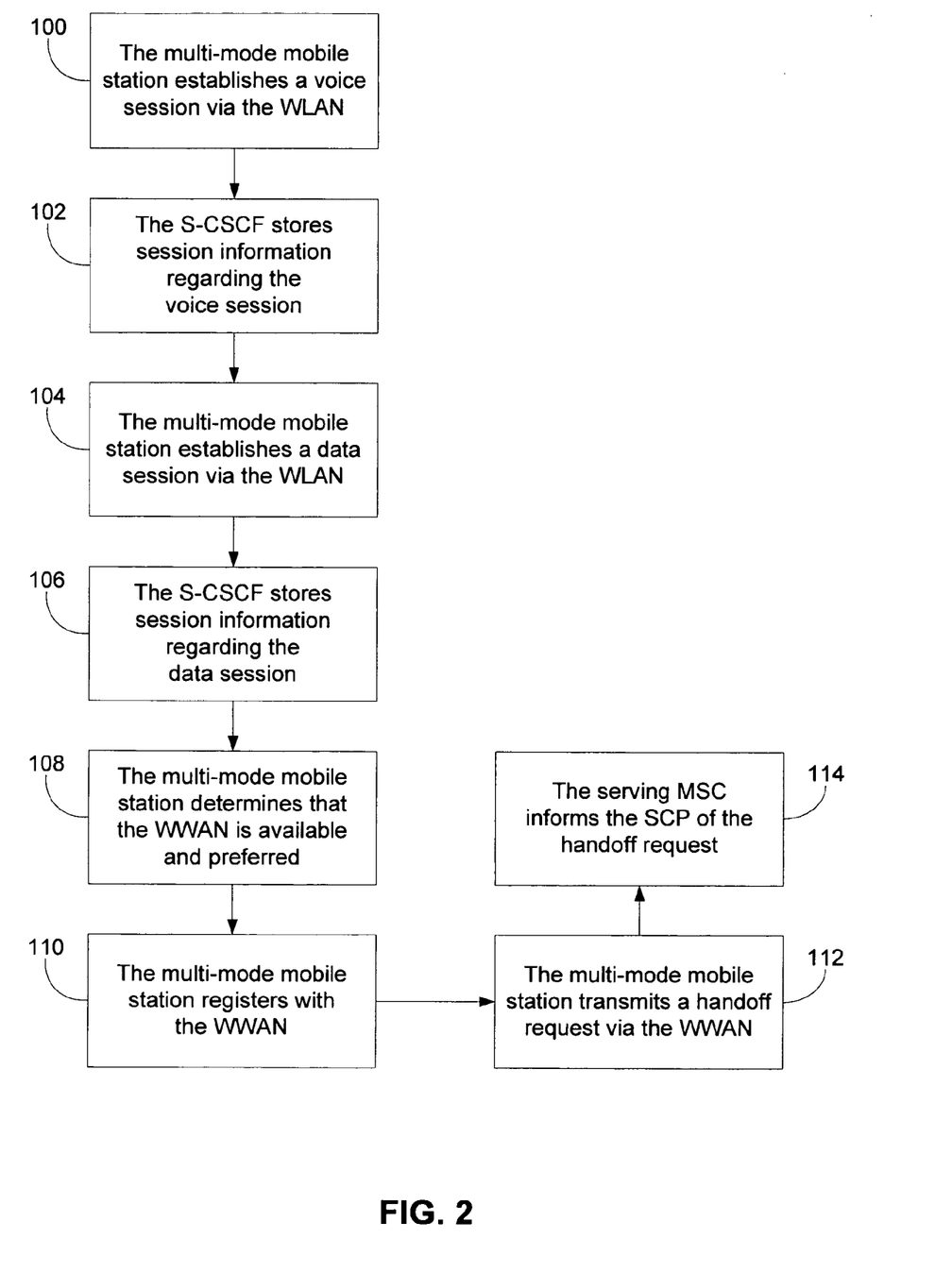
FIG. 2 is a flow chart illustrating a method of operation for a handoff from the WLAN to the WWAN, in accordance with an exemplary embodiment of the present invention.
Figure 3:
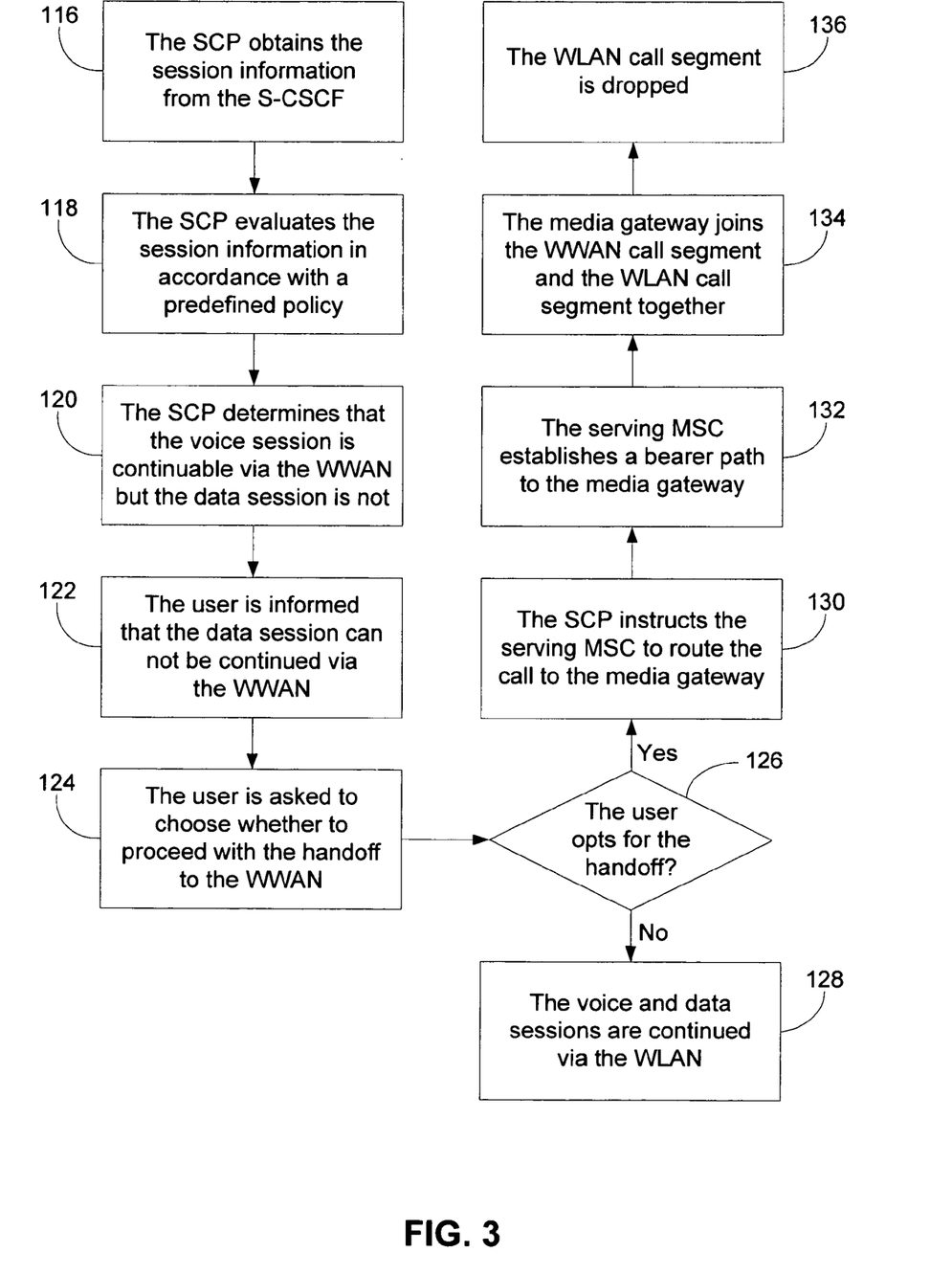
FIG. 3 is a flow chart illustrating a method of operation for a handoff from the WLAN to the WWAN, which continues the method of FIG. 2, in accordance with an exemplary embodiment of the present invention.

FIGS. 2 and 3 illustrate an exemplary method of operation for a handoff from the WLAN to the WWAN. In this example, the multi-mode mobile station establishes a voice session and a data session via the WLAN, but only the voice session is continuable via the WWAN. The exemplary method illustrated in FIGS. 2 and 3 may use the network architecture shown in FIG. 1. However, it is to be understood that other network architectures could be used.

With reference to FIG. 2, the process may begin when the multi-mode mobile station establishes a voice session via the WLAN, as indicated by block 100. The voice session could be, for example, a voice call with an endpoint such as landline telephone 68. S-CSCF 32 may control the establishment of the voice session so that the media is conveyed through an anchor point, such as media gateway 64. Thus, the voice session may be established with a first segment between landline telephone 68 and media gateway 64 (i.e., through PSTN 54) and a second segment between media gateway 64 and multi-mode mobile station 16 (i.e., through packet-switched network 28 and WLAN 12).

The S-CSCF that establishes the voice session through the anchor point also stores session information regarding the voice session, as indicated by block 102. The session information may indicate the type of session (e.g., voice) and may identify the endpoints involved in the session. Thus, the session information may identify the multi-mode mobile station involved in the call, e.g., by its mobile directory number (MDN), and the other party or parties involved in the call, e.g., the directory number of landline telephone 68. The session information may also identify the media gateway that serves as the anchor point for the session, as well as a session identifier that identifies the particular voice session in the media gateway. Service information, regarding what services are being used or are available to be used during the voice session, may also be included in the session information.

While the multi-mode mobile station is still engaged in the voice session via the WLAN, the multi-mode mobile station also establishes a data session via the WLAN, as indicated by block 104. The data session could be, for example, receiving streaming video from MMS 72, with the video conveyed through an MRF as an anchor point. The S-CSCF also stores session information regarding the data session, as indicated by block 106. The session information may indicate the type of data session, e.g., streaming video, and may identify the endpoints of the data session, i.e., the multi-mode mobile station and MMS 72. The session information may also include service information regarding what services are being used or are available to be used during the data session.

While the multi-mode mobile station is engaged in the voice session and the data session, the multi-mode mobile station may also be monitoring signal strengths from the WLAN and the WWAN. At some point, the multi-mode mobile station determines that the WWAN is available and preferred, as indicated by block 108. For example, the signal strength from the WLAN may be at such a low level that a handoff may be advisable, and the signal strength from the WWAN may be sufficient so as to accept the handoff. This may occur, for example, if the multi-mode mobile station is moving out of an area with good wireless coverage from the WLAN and into an area with good wireless coverage from the WWAN.

In response to determining that the WWAN is available and preferred, the multi-mode mobile station registers with the WWAN, as indicated by block 110. For example, the multi-mode mobile station may transmit a registration request via air interface 42. In response, MSC 46 may transmit an IS-41 Registration Notification (REGNOT) message to HLR 52. HLR 52 may respond with the multi-mode mobile station's WWAN service profile, which is then stored in VLR 48.

The multi-mode mobile station then transmits a handoff request via the WWAN, as indicated by block 112. The handoff request could be, for example, a request to originate a call to a predetermined directory number that is used to indicate a handoff. The handoff request may also include information about the WLAN that is currently serving the multi-mode mobile station. For example, the handoff request may include an IP address or other identification of the S-CSCF.

The serving MSC informs the SCP of the handoff request, as indicated by block 114. This may occur, for example, because the handoff request corresponds to a trigger condition defined by the multi-mode mobile station's WWAN service profile. In response to the trigger condition, the serving MSC may send the SCP a WIN invoke message with information regarding the handoff request.

In response, the SCP obtains the session information from the S-CSCF, as indicated by block 116. If the handoff request identified the S-CSCF, then SCP 50 may obtain the session information by querying S-CSCF 32 directly. For example, SCP 50 may send a SIP INVITE message with information parameters to S-CSCF 32. Alternatively, SCP 50 may send the query to I-CSCF 38. The query may identify the multi-mode mobile station, e.g., by MDN or in some other way. Based on this identification, I-CSCF 38 may determine that S-CSCF 32 is serving the multi-mode mobile station, e.g., by querying HSS 36. I-CSCF 38 then obtains the session information from S-CSCF 38 and forwards it to SCP 50.

The SCP then evaluates the session information in accordance with a predefined policy, as indicated by block 118. The predefined policy determines which communication sessions can be continued via the WWAN. The policy may take a number of considerations into account, for example, the type of communication session (e.g., whether voice or data), the services being used or available to be used during the communication session, the capabilities of the WWAN (e.g., its network architecture and available bandwidth), the device capabilities of the multi-mode mobile station, the time of day, traffic load, and/or the service level to which the user of the multi-mode mobile station has subscribed. The SCP may itself apply this policy. Alternatively, the SCP may query a policy server to apply the policy.

In this example, the SCP determines that, in accordance with the predefined policy, the voice session is continuable via the WWAN but the data session is not, as indicated by block 120. This result may occur for any number of reasons. In some cases, the WWAN may lack the bandwidth and/or network architecture to support the data session. In other cases, the bandwidth and network architecture may be sufficient, but the multi-mode mobile station may not subscribe to a service level that authorizes such data sessions via the WWAN. In still other cases, the policy may simply not allow any handovers of this type of data session to the WWAN. Although in this example, the data session was not continuable in accordance with the policy, it is to be understood that this outcome is exemplary only. Other policies may have allowed the continuation of both the voice and data sessions via the WWAN.

The user may be informed that the data session can not be continued via the WWAN, as indicated by block 122. The user may be informed in various ways. For example, the SCP may instruct the serving MSC to put the voice session on hold and send a voice message to the multi-mode mobile station. Alternatively, the SCP may instruct the serving MSC to send a text message to the multi-mode mobile station.

The user may also be asked to choose whether to proceed with the handoff to the WWAN, as indicated by block 124. For example, if a voice message was used to inform the user that the data session can not be continued, then the voice message may also ask the user whether to proceed with the handoff. The user may be able to indicate his choice in various ways, e.g., by pressing the keypad of the multi-mode mobile station to transmit DTMF tones or by giving voice commands that can then be interpreted by a voice command platform.

Thus, whether the handoff to the WWAN is effected may depend on whether the user opts for the handoff, as indicated by block 126. If the user does not opt for the handoff, then the voice and data sessions are continued via the WLAN, as indicated by block 128. The multi-mode mobile station may, however, again request a handoff to the WWAN at a later time, for example, when the data session is completed.

If the user opts for the handoff, the voice session is continued via the WWAN, but the data session is dropped. To continue the voice session via the WWAN, the SCP instructs the serving MSC to route the call originated by the multi-mode mobile station to request the handoff to the media gateway that serves as the anchor point for the original voice session, as indicated by block 130. In response, the serving MSC establishes a bearer path to the media gateway, e.g., a bearer path from MSC 46 through circuit-switched network 56 to media gateway 64, as indicated by block 132. The serving MSC may do this sending SS7 signaling to MGCF 66 via signaling network 58, and MGCF 66 may inform S-CSCF 32 using SIP signaling. In this way a WWAN call segment is established, extending from the serving MSC to the media gateway.

The media gateway then joins together the newly-established WWAN call segment and the WLAN call segment that was previously established between the media gateway and the WLAN, as indicated by block 134. Thus, the media gateway mixes the media of the WLAN and WWAN call segments, so that media transmitted by the endpoint (e.g., landline telephone 68) is conveyed over both the WWAN and WLAN call segments, and media transmitted over either call segment is conveyed to the endpoint.

At some point, the WLAN call segment is dropped, as indicated by block 136. The WLAN call segment could be dropped by multi-mode mobile station, e.g., in response to receiving media via its WWAN interface. Alternatively, the WLAN call segment could by dropped by the S-CSCF, e.g., in response to being informed that the WWAN call segment has been successfully established.

Although FIGS. 2 and 3 illustrate the case of a handoff from WLAN to WWAN, handoffs from WWAN to WLAN may also be supported. Thus, while engaged in one or more communication sessions via the WWAN, a multi-mode mobile station may determine that the WLAN is available and preferred. In response, the multi-mode mobile station may register with the WLAN and then transmit a handoff request via the WLAN. The handoff request could be a SIP INVITE message that invites a session with a predetermined handoff number. In addition, the SIP INVITE message may indicate that the multi-mode mobile station is currently being served by the WWAN. The S-CSCF may receive the handoff request and forward it to an application server, e.g., based on filter criteria.

The application server may then seek to obtain the session information from the WWAN. The application server may do this by having the S-CSCF query the SCP, e.g., using SIP signaling. The SCP may then query the HLR to locate the multi-mode mode mobile station, i.e., to determine which MSC is currently serving the multi-mode mobile station. The SCP may do this, for example, by sending the HLR a WIN ServiceRequest or Search invoke message. Once the serving MSC is identified, the SCP engages in signaling with the serving MSC, e.g., using IS-41 Facilities Directive messages, to obtain the session information regarding the multi-mode mobile station's communication sessions. The SCP would then forward the session information to the S-CSCF.

The application server would then evaluate the session information in accordance with a predefined policy to determine which of the multi-mode mobile station's one or more communication sessions can be continued via the WLAN. For example, the application server may determine that a voice session can be continued via the WLAN. To effect a handoff of the voice call, the S-CSCF may establish a bearer path between the serving MSC and the WLAN, e.g., via circuit-switched network 56, media gateway 64, and packet-switched network 28. Once this WLAN call segment is established, the original WWAN call segment may be dropped.

If the application server determines that one or more of the multi-mode mobile station's communication sessions can not be continued via the WLAN, then the user may be so informed and may be asked to choose whether to proceed with the handoff to the WLAN. For example, pre-paid voice calls might not be continuable via the WLAN.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for communication session management for a multi-mode mobile station, said multi-mode mobile station having a first interface for wireless communication with a first wireless network and a second interface for wireless communication with a second wireless network, said method comprising:
    establishing at least one communication session with said multi-mode mobile station via said first wireless network;
    storing session information regarding said at least one communication session;
    said multi-mode mobile station registering via said second wireless network;
    after registering via said second wireless network, said multi-mode mobile station transmitting a handoff request via said second wireless network;
    receiving said handoff request; and
    in response to said handoff request, evaluating said session information to determine, in accordance with a policy, which of said at least one communication session, if any, can be continued via said second wireless network, wherein said policy considers bandwidth availability in said second wireless network.

2. The method of claim 1, wherein said first wireless network is a wireless local area network (WLAN) and said second wireless network is a wireless wide area network (WWAN).

3. The method of claim 2, wherein a call session control function (CSCF) stores said session information, further comprising:
    a service control point (SCP) obtaining said session information from said CSCF.

4. The method of claim 1, wherein said first wireless network is a wireless wide area network (WWAN) and said second wireless network is a wireless local area network (WLAN).

5. The method of claim 4, wherein a mobile switching center (MSC) stores said session information, further comprising:
    an SCP obtaining said session information from said MSC and providing said session information to a CSCF.

6. The method of claim 1, wherein said at least one communication session includes a voice session.

7. The method of claim 1, wherein said at least one communication session includes a data session.

8. The method of claim 1, further comprising:
    identifying a continuable communication session in said at least one communication session, in accordance with said policy; and
    continuing said continuable communication session via said second wireless network.

9. The method of claim 1, further comprising:
    identifying a non-continuable communication session in said at least one communication session, in accordance with said policy; and
    transmitting a notification to said multi-mode mobile station that said non-continuable communication session can not be continued via said second wireless communication network.

10. The method of claim 1, further comprising:
    identifying a continuable communication session and a non-continuable communication session in said at least one communication session, in accordance with said policy;
    transmitting a notification to said multi-mode mobile station that said non-continuable communication session can not be continued via said second wireless communication network;
    providing a user of said multi-mode mobile station with an option whether to continue said continuable communication session via said second wireless network; and
    continuing said continuable communication session via said second wireless network, if said user has opted to continue.

11. The method of claim 1, further comprising:
    identifying a continuable communication session in said at least one communication session, in accordance with said policy;
    determining that said continuable communication session would proceed via said second wireless network at a reduced level of performance relative to said first wireless network; and
    transmitting a notification to said multi-mode mobile station regarding said reduced level of performance.

12. The method of claim 11, further comprising:
    providing a user of said multi-mode mobile station with an option whether to continue said continuable communication session via said second wireless network; and
    continuing said continuable communication session via said second wireless network, if said user has opted to continue.

13. A system for communication session management for a multi-mode mobile station, said multi-mode mobile station having a first interface for wireless communication with a first wireless network and a second interface for wireless communication with a second wireless network, said system comprising:
    a first-network storage system for storing first-network session information regarding first-network communication sessions established with said multi-mode mobile station via said first wireless network;
    a second-network storage system, separate from said first-network storage system, for storing second-network session information regarding second-network communication sessions established with said multi-mode mobile station via said second wireless network;
    a first-network evaluation system for evaluating, in response to a second-to-first network handoff request, said second-network session information to determine, in accordance with a first-network policy, which of said second-network communication sessions, if any, can be continued via said first wireless network, wherein said first-network evaluation system obtains said second-network session information from said second-network storage system; and a second-network evaluation system, separate from said first-network evaluation system, for evaluating, in response to a first-to-second network handoff request, said first-network session information to determine, in accordance with a second-network policy, which of said first-network communication sessions, if any, can be continued via said second wireless network, wherein said second-network evaluation system obtains said first-network session information from said first-network storage system.

14. The system of claim 13, wherein said first wireless network is a wireless wide area network (WWAN) and said second wireless network is a wireless local area network (WLAN).

15. The system of claim 14, wherein said first-network storage system includes an MSC, said second-network storage system includes a CSCF, said first-network evaluation system includes an SCP, and said second-network evaluation system includes an application server.

16. A method for session handoff between a first wireless network and a second wireless network for a multi-mode mobile station, said multi-mode mobile station having a first interface for wireless communication with said first wireless network and a second interface for wireless communication with said second wireless network, said method comprising:

establishing a plurality of communications sessions with said multi-mode mobile station via said first wireless network, said plurality of communication sessions including a first communication session and a second communication session;

storing session information regarding said plurality of communication sessions in a storage system;

receiving a handoff request after said storage system has stored said session information;

in response to said handoff request, evaluating said session information to determine, in accordance with a policy, which of said plurality of communication sessions, if any, can be continued via said second wireless network, wherein said policy considers bandwidth availability in said second wireless network.

17. The method of claim 16, further comprising:

determining that said first communication session can be continued via said second wireless network, in accordance with said policy; and continuing said first communication session via said second wireless network.

18. The method of claim 17, wherein said first communication session is a voice session.

19. The method of claim 17, further comprising:

determining that said second communication session can not be continued via said second wireless network, in accordance with said policy.

20. The method of claim 19, wherein said second communication session is a data session.

\* \* \* \* \*